United States Patent [19]

Henmi

[11] Patent Number: 4,805,235
[45] Date of Patent: Feb. 14, 1989

[54] OPTICAL TRANSMITTER COMPRISING AN OPTICAL FREQUENCY DISCRIMINATOR

[75] Inventor: Naoya Henmi, Tokyo, Japan

[73] Assignee: NEC Corporation, Tokyo, Japan

[21] Appl. No.: 15,705

[22] Filed: Feb. 17, 1987

[30] Foreign Application Priority Data

Feb. 17, 1986 [JP]   Japan .................................. 61-32284
May 2, 1986 [JP]   Japan ................................ 61-102417

[51] Int. Cl.$^4$ ............................................. H04B 9/00
[52] U.S. Cl. ................................... 455/608; 455/609; 455/611; 455/618
[58] Field of Search ............... 455/606, 607, 608, 609, 455/611, 617, 618, 605

[56] References Cited

U.S. PATENT DOCUMENTS

3,435,230  3/1969  Courtney-Pratt ................... 455/608
3,699,445  10/1972  Kinsel ................................ 455/608
4,561,119  12/1985  Epworth ............................. 455/609

FOREIGN PATENT DOCUMENTS

2168561  6/1986  United Kingdom ................. 455/611

OTHER PUBLICATIONS

"Optical Phase Modulation in an Injection Locked AlGaAs Semiconductor Laser", Elec. Letters, 3-4-82, vol. 18, #5, Kobayashi et al, pp. 210-211.
"Single Mode Operation of 500 Mbit/s Modulated AlGaAs Semiconductor Laser", Elec. Letters, 9-11-80, vol. 16, #19, Kobayashi et al, pp. 746-748.
"Application of Injection Locked Semiconductor Lasers for Optical Communications in the Wavelength Range 0.8 μm to 1.6 μm", Conference on Communications Equipment and System, 4-22-82, Maylon et al, pp. 285-290.
IOOC-ECOC '85, Venezia, Italy, Oct. 1-4, 1985, Technical Digest, vol. III, pp. 49-52.
OFC/OFS '85, San Diego, Calif., Feb. 13-14, 1985; Technical Digest, pp. 22-24.
IEEE Journal of Quantum Electronics, Apr. 1982, vol. QE-18, No. 4, pp. 582-595.

*Primary Examiner*—Robert L. Griffin
*Assistant Examiner*—Leslie Van Beek
*Attorney, Agent, or Firm*—Foley & Lardner, Schwartz, Jeffery, Schwaab, Mack, Blumenthal & Evans

[57] ABSTRACT

Supplied with an optical signal from a directly modulated semiconductor laser (11) in an optical transmitter, an optical frequency discriminator (15) converts a frequency modulated component of the optical signal to an intensity modulated component and produces an output optical beam which consists essentially of the intensity modulated component. Preferably, a negative feedback circuit (32, 33) is supplied in effect with the output optical beam representative of mark and space codes and controls the semiconductor laser and/or the optical frequency discriminator to keep the extinction ratio of the output optical signal at an optimum value such that the optical frequency discriminator has a transmissivity of about 90°/o for a predetermined one of the mark and space codes and a substantially zero transmissivity for the other of the mark and space codes.

4 Claims, 3 Drawing Sheets

OPTICAL TRANSMITTER COMPRISING AN OPTICAL FREQUENCY DISCRIMINATOR

BACKGROUND OF THE INVENTION

This invention relates to an optical transmitter which is for use in an optical communication network and comprises a directly modulated semiconductor laser.

In optical communication, electric signals are ordinarily transmitted as an optical beam representative of mark and space codes. The semiconductor laser is supplied with a modulated injection current to produce an intensity modulated optical signal as the optical beam. For this purpose, the semiconductor laser is preliminarily supplied with a d.c. bias current of a level which is near to the oscillation threshold level of the semiconductor laser. An electric pulse current representative of the mark and the space codes is superimposed on the d.c. bias current to provide the modulated injection current. It is usual that the optical beam has a high intensity for each mark code and a low intensity for each space code. At any rate, a ratio of the high intensity to the low density is called an extinction ratio.

A paper was contributed by M. Shikata et al, including the present applicant, to a joint meeting of the 5th International Conference on Integrated Optics and Optical Fibre Communication (IOOC) and the 11th European Conference on Optical Communication (ECOC) held October 1985 in Venezia, Italy, and is included in Technical Digest, Volume III, pages 49 to 52, under the title of "1.5 $\mu$m High Bit Rate Long Span Transmission Experiments Employing a High Power DFB-DC-PBH Laser Diode." In the manner described in the Shikata et al paper, the optical communication network has a degraded performance when the extinction ratio is poor. The d.c. bias current has therefore been selected a little lower than the oscillation threshold level particularly when the mark and the space codes are transmitted at a high bit rate, typically, at 1 Gb/s or higher.

Prior to the Shikata et al paper, a paper was contributed by J. E. Bowers et al to another joint meeting of Conference on Optical Fiber Communication (OFC) and Third International Conference on Optical Fiber Sensors (OFS) held February 1985 in San Diego, Calif., and is included as paper number MH3 in Technical Digest, pages 22 to 24, under the title of "Fiber-optic frequency discriminator for microwave optical communications." According to the Bowers et al paper, the semiconductor laser is used in producing a frequency modulated optical signal as the optical beam. In a counterpart optical receiver, an optical frequency discriminator is used in converting the frequency modulated optical signal to an intensity modulated optical signal. The optical frequency discriminator may typically be a Mach-Zehnder interferometer. This makes it possible to avoid degradation of the extinction ratio even when the d.c. bias current is selected above the oscillation threshold level. It is, however, mandatory to couple a polarization controller to the optical frequency discriminator. This is because the optical frequency discriminator has a polarization dependency.

SUMMARY OF THE INVENTION

It is therefore an object of the present invention to provide an optical transmitter in which a d.c. bias current can be selected for a directly modulated semiconductor laser above the oscillation threshold level even for a high bit rate, typically, 1 Gb/s or higher.

It is another object of this invention to provide an optical transmitter of the type described, which need not comprise a polarization controller.

Other objects of this invention will become clear as the description proceeds.

According to this invention, there is provided an optical transmitter comprising a semiconductor laser responsive to a modulated injection current for generating an optical signal which includes a frequency modulated component; an optical frequency discriminator responsive to said optical signal for converting said frequency modulated component to an intensity modulated component to produce an output optical beam which consists essentially of said intensity modulated component; said modulated injection current being representative of mark and space codes, wherein said optical frequency discriminator produces said output optical beam with a high intensity for a predetermined one of said mark and said space codes and with a low intensity for the other of said mark and said space codes; monitoring means for monitoring said output optical beam to produce an electric signal representative of a ratio of said low intensity to said high intensity; and a negative feedback circuit responsive to said electric signal for controlling at least one of said semiconductor laser and said optical frequency discriminator to keep said ratio substantially at an optimum value.

DESCRIPTION OF THE PREFERRED EMBODIMENT

Figure 1:
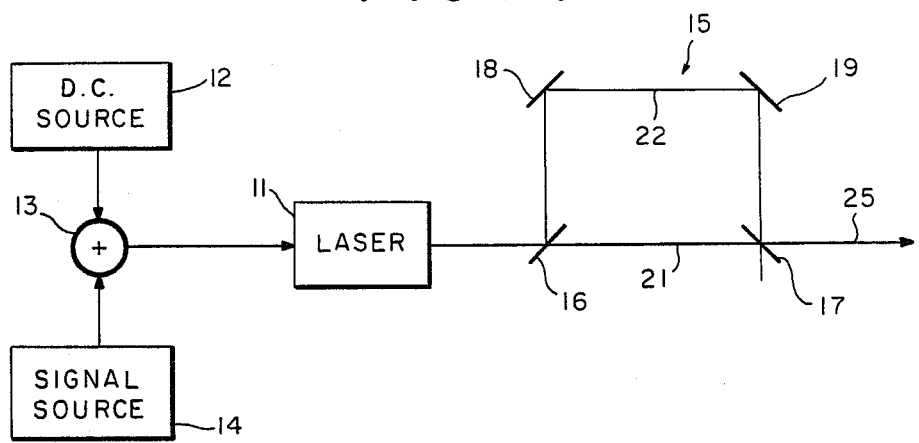
FIG. 1 is a block diagram of an optical transmitter according to a first embodiment of the instant invention.

Referring to FIG. 1, an optical transmitter is for use in an optical communication network and comprises a semiconductor laser 11 according to a first embodiment of the present invention. In the manner known in the art, the semiconductor laser 11 has a certain oscillation threshold level and is directly modulated. More particularly, the semiconductor laser 11 is supplied with a d.c. bias current from a d.c. source 12 through an adder 13. The d.c. bias current is given a level which is a little higher than the oscillation threshold level. A signal source 14 is for producing an electric pulse current representative of mark and space codes. The adder 13 is for superimposing the electric pulse current on the d.c.

bias current to supply an adder output signal to the semiconductor laser 11 as a modulatind injection current. The semiconductor laser 11 generates an optical signal which includes a frequency modulated component in the manner discribed in an article which was contributed by Soichi Kobayashi et al to IEEE Journal of Quantum Electronics, Volume QE-18, Number 4 (April 1982), pages 582 to 595 and entitled "Direct Frequency Modulation in AlGaAs Semiconductor Lasers."

The optical signal is linearly polarized and is delivered to a Mach-Zehnder interferometer 15 which is used as an optical frequency discriminator. More particularly, the optical signal is equally divided by a first semi-transparent mirror 16 into first and second parts. The first part is led directly to a second semi-transparent mirror 17. The second part is led to the second semi-transparent mirror 17 through first and second mirrors 18 and 19 which are placed nearer to the first and the second semi-transparent mirrors 16 and 17. In this manner, the first part reaches the second semi-transparent mirror 17 through a first or direct optical path 21. The second part reaches the second semi-transparent mirror 17 through a second optical path 22.

Depending on a path difference between the first and the second optical paths 21 and 22, the second semi-transparent mirror 17 produces first and second intensity modulated optical signals which travel substantially along the first optical path 21 and along an optical path from the second mirror 19 to the second semi-transparent mirror 17. In the example being illustrated, the first intensity modulated optical signal is delivered from the second semi-transparent mirror 17 to an optical fiber 25 of the optical communication network as an output optical beam.

It is now appreciated that the optical transmitter includes the semiconductor laser 11 responsive to the modulated injection current for generating the optical signal which includes a frequency modulated component. The optical frequency discriminator (15) is used to convert the frequency modulated component to an intensity modulated component and to produce the optical output beam which consists essentially of the intensity modulated component. Inasmuch as the optical signal of the semiconductor laser 11 is linearly polarized, it is unnecessary to control polarization of the first and the second parts which travel along the optical frequency discriminator and are subjected to interference at the second semi-transparent mirror 17.

Figure 2:
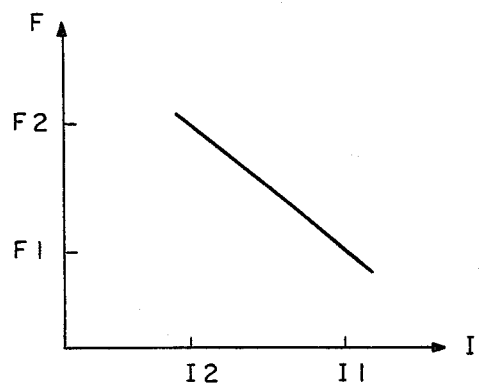
FIG. 2 schematically exemplifies a characteristic curve of a semiconductor laser used in the optical transmitter depicted in FIG. 1.
Figure 3:
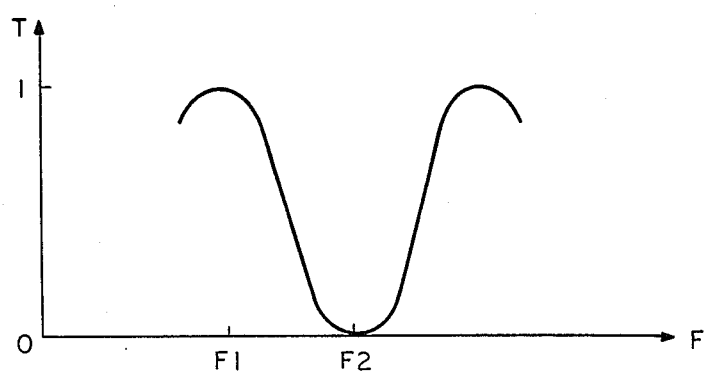
FIG. 3 schematically shows a characteristic curve of an optical frequency discriminator used in the optical transmitter illustrated in FIG. 1.

Turning to FIGS. 2 and 3, the semiconductor laser 11 and the Mach-Zehnder interferometer 15 will be described more in detail. The oscillation threshold level of the semiconductor laser 11 was 20 mA. The semiconductor laser 11 was for generating the optical signal at a wavelength range of 1.5 microns in the single axial or longitudinal mode. The signal source 14 was for the electric pulse current of a bit rate of 1 Gb/s. The injection current had an instantaneous current value I which had a first current value of I1 of 50 mA for each mark code and a second current value I2 of 30 mA for each space code.

In the manner depicted in FIG. 2 wherein the ordinate shows an instantaneous frequency F for the current value I shown along the abscissa, the frequency modulated component has a first or lower frequency F1 for each mark code and a second or higher frequency F2 for each space code. The first and the second frequencies F1 and F2 had a frequency difference of about 20 GHz. Inasmuch as the injection current was of an appreciably higher level than the oscillation threshold level, the semiconductor laser 11 was stably operated even at the high bit rate of 1 Gb/s without chirping. Incidentally, it is known in the art that the current value I and the frequency F are interrelated by a characteristic curve of a positive or a negative slope depending on the bit rate at which the semiconductor laser 11 is driven.

The Mach-Zehnder interferometer 15 has a path difference of about 7.5 mm between the first and the second optical paths 21 and 22. In the manner exemplified in FIG. 3, the path difference is for discriminating between the first and the second frequencies F1 and F2. More specifically, the Mach-Zehnder interferometer 15 has a transmissivity T which varies between a first transmissivity of unity for the first frequency F1 and a second transmissivity of zero for the second frequency F2. In practice, the path difference was minutely adjusted so as to make the Mach-Zehnder interferometer 15 have the second transmissivity of substantially zero for the second frequency F2.

Figure 4:
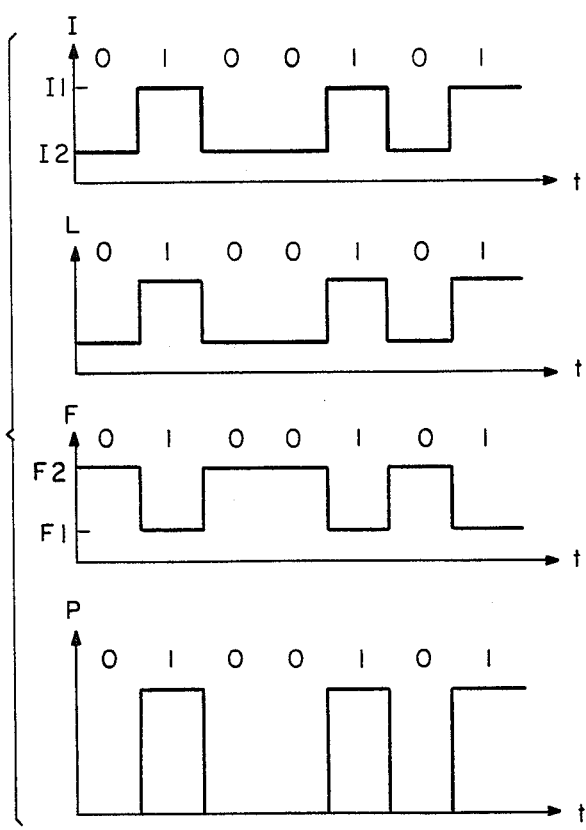
FIG. 4 is a schematic time chart for use in describing operation of the optical transmitter shown in FIG. 1.

Further turning to FIG. 4, operation will be described as regards a typical optical transmitter of the type illustrated with reference to FIG. 1. Time t is shown along the abscissa of each figure part of FIG. 4. Each mark code is represented by "1" and each space code, by "0". In the manner illustrated along the top line, the current value I of the electric pulse current varies between the first and the second current values I1 and I2. As depicted along a second line from the top, the semiconductor laser 11 generates the optical signal with an intensity level L which varies between a high level for each mark code and a low level for each space code. As exemplified along a third line from the top, the frequency F of the optical signal varies between the first or lower frequency F1 and the second or higher frequency F2 for the mark and the space codes. In the manner shown along the bottom line, the Mach-Zehnder interferometer 15 produces the output optical beam with an intensity or power P which varies between a high intensity for each mark code and a low intensity of substantially zero for each space code.

Reviewing FIGS. 1 through 4, use of the Mach-Zehnder interferometer 15 inevitably gives rise to jitter in leading and trailing edges of a pulse waveform of the optical output beam due to the path difference. The jitter was, however, less than 25 picoseconds and was negligible at the bit rate of 1 Gb/s. The high intensity of the optical output beam was at least 90°/o of the high level of the optical signal which was generated by the semiconductor laser 11 and supplied to the Mach-Zehnder interferometer 15. In contrast to the optical signal which had an extinction ratio of only 1:3, the output optical beam had an astonishingly high extinction ratio of 1:100 where the extinction ratio is a ratio of the low level or intensity to the high level or intensity. Between the high and the low intensities, the optical output beam had an intensity difference which is 1.4 times a level difference between the high and the low levels of the optical signal.

Figure 5:
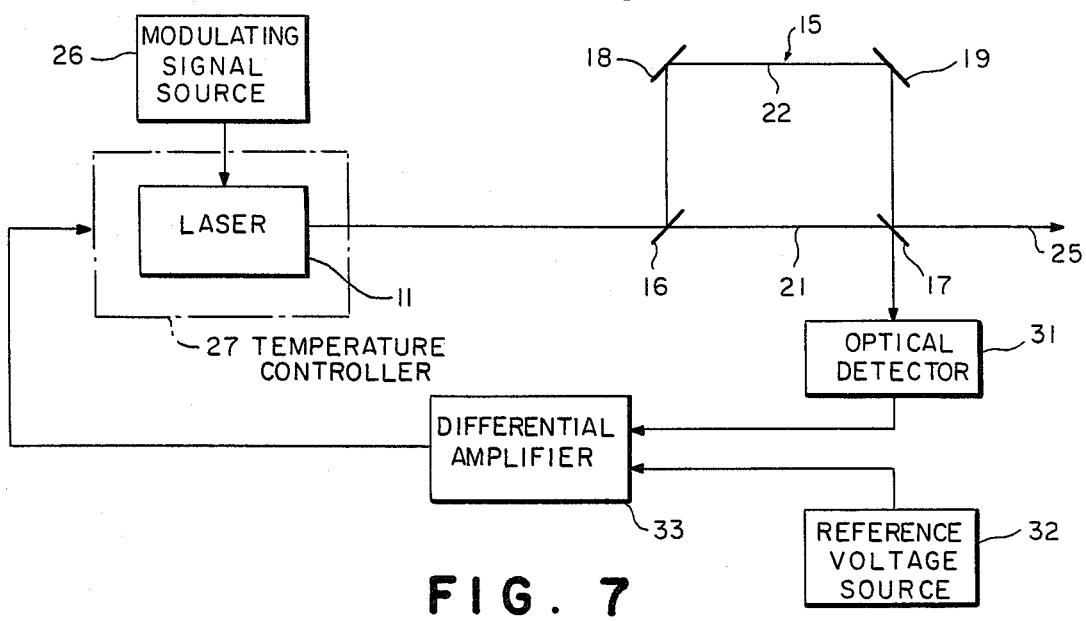
FIG. 5 is a block diagram of an optical transmitter according to a second embodiment of this invention.

Referring now to FIG. 5, description will proceed to an optical transmitter according to a second embodiment of this invention. In FIG. 5, the optical transmitter comprises similar parts which are designated by like reference numerals. The d.c. source 12, the adder 13, and the signal source 14 of FIG. 1 are collectively depicted as a modulating signal source 26. For the purpose which will presently become clear, the semiconductor laser 11 is accompanied by a temperature controller 27.

Like in the typical optical transmitter illustrated with reference to FIG. 1, the semiconductor laser 11 had an oscillation threshold level of 20 mA and was directly modulated by the injection current which was produced by the modulating signal source 26 to represent the mark and the space codes. The semiconductor laser 11 was for generating the optical signal which had a frequency difference of about 20 GHz between the first or lower frequency F1 for each mark code and a second or higher frequency F2 for each space code.

It is known in the art that the frequency F of the optical signal fluctuates when the temperature of the semiconductor laser 11 varies. The Mach-Zehnder interferometer 15 or a similar optical frequency discriminator has a frequency discrimination characteristic which also fluctuates due to mechanical shocks or other external disturbances. It is therefore very disirable to prevent the extinction ratio from degrading as a result of such external disturbances.

For the injection current representative of non-return to zero codes in which the mark codes appear at a rate of m, it will be assumed that the semiconductor laser 11 supplies the Mach-Zehnder interferometer 15 with the optical signal of a first power P1 for each mark code and a second power P2 for each space code. Each of the first and the second intensity modulated optical signals has an average power of an optimum value Po which is given by:

$$Po = m(1-k)P1 + (1-m)P2,$$

when the first transmissivity of the Mach-Zehnder interferometer 15 is equal to k which is less than unity and when the second transmissivity is equal to zero. If the frequency F of the optical signal is subjected to a shift by the external disturbances, the first transmissivity undergoes a first-order small variation in the direction with sense of the shift. The second transmissivity always becomes greater than zero by a second-order small value. With the second-order small value neglected, the average power becomes a fluctuating power Pf which is equal in the first-order approximation to:

$$Pf = m(1-k-\Delta k)P1 + (1-m)P2,$$

where $\Delta k$ represents the first-order small variation.

Figure 6:
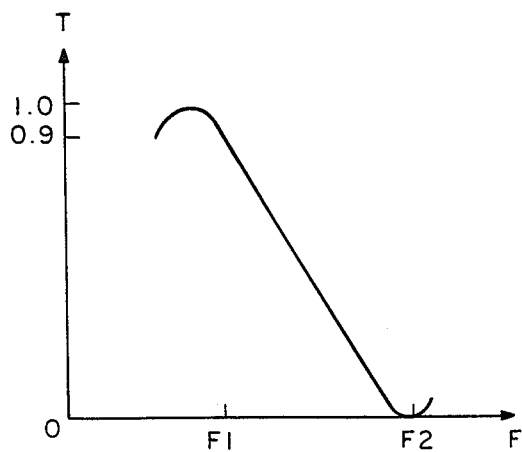
FIG. 6 schematically shows a characteristic curve of an optical frequency discriminator used in the optical transmitter illustrated in FIG. 5.

Turning to FIG. 6 for a short while, the first transmissivity of the Mach-Zehnder interferometer 15 (FIG. 5) is set at 0.9 or 90°/o for the first frequency F1 of the optical signal supplied thereto from the semiconductor laser 11. For this purpose, the first and the second optical paths 21 and 22 are made to have a path difference of about 6.0 mm. The Mach-Zehnder interferometer 15 is capable of discriminating a frequency difference of 25 GHz which is wider than the frequency difference of 20 GHz between the first and the second frequencies F1 and F2 of the optical signal. In practice, the path difference was minutely adjusted so as to render the second transmissivity substantially equal to zero for the second frequency F2.

Turning back to FIG. 5, the first intensity modulated optical signal is delivered from the Mach-Zehnder interferometer 15 to the optical fiber 25 of the optical communication network in the manner described earlier. The second intensity modulated optical signal is supplied to an optical detector or photodetector 31 which is for producing an electric signal of a variable voltage representative of the average power of the second intinsity modulated optical signal and consequently of the output optical beam. A reference voltage source 32 is for generating a reference voltage representative of the optimum power Po. Responsive to the variable voltage and the reference voltage, a differential amplifier 33 delivers a control signal to the temperature controller 27. When the output optical beam has the optimum power Po, the control signal has a zero voltage and is used in making the semiconductor laser 11 generate the optical signal variable between the first and the second frequencies F1 and F2 which are for rendering the average power equal to the optimum power Po.

More specifically, the variable voltage represents the fluctuating power Pf in general. When the fluctuating power becomes greater than the optimum power, the control signal is used to raise the frequency F of the optical signal as by reducing the temperature of the semiconductor laser 11. When the fluctuating power becomes less than the optimum power, the control signal is used to reduce the frequency F of the optical signal.

It is now understood that a combination of the reference voltage source 32 and the differential amplifier 33 serves as a negative feedback circuit for the semiconductor laser 11. The negative feedback circuit is used so as to keep the extinction ratio substantially at an optimum value. When the first transmissivity is equal to 0.9, the high intensity of the output optical beam was only 0.5 dB less than the high level of the optical signal. The intensity difference of the output optical beam was 1.3 times the level difference of the optical signal. The extinction ratio was kept substantially at 1:100.

Figure 7:
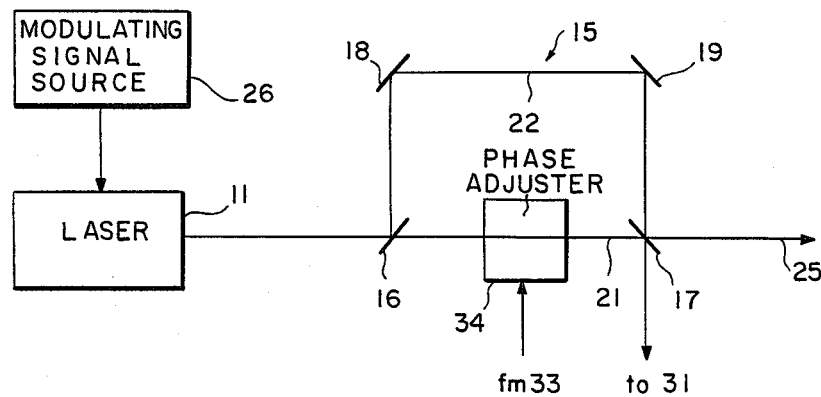
FIG. 7 is a partial block diagram of an optical transmitter according to a third embodiment of this invention.

Referring to FIG. 7, similar parts are designated again by like reference numerals in an optical transmitter according to a third embodiment of this invention. The semiconductor laser 11 is not accompanied by the temperature controller 27 described in conjunction with FIG. 5. Instead, a phase adjuster 34 is interposed in the first optical path 21 of the Mach-Zehnder interferometer 15 between the first and the second semi-transparent mirrors 16 and 17 for the purpose which will shortly become clear. The phase adjuster 34 may be a crystal of lithium niobate ($LiNbO_3$) which has an effective optical length variable with a control voltage supplied across the crystal. Alternatively, the phase adjuster 34 may be a piezoelectric crystal which is supplied with a control voltage to have a variable refractive index.

As in FIG. 5, the second intensity modulated optical signal is supplied from the Mach-Zehnder interferometer 15 to the optical detector 31. The control signal of the differential amplifier 33 is used to provide the control voltage for the phase adjuster 34. When the fluctuating power Pf is greater than the optimum power Po, the control signal is used to reduce the effective optical length. This shifts the frequency discrimination characteristic of the Mach-Zehnder interferometer 15 towards a higher frequency region. When the fluctuating power is less than the optimum power, the control signal is used in shifting the frequency discrimination characteristic towards a lower frequency region by lengthening the effective optical length. It has been confirmed that the extinction ratio is kept substantially at the optimum value even when the negative feedback circuit is used in this manner to control the Mach-Zehnder interferometer 15.

Figure 8:
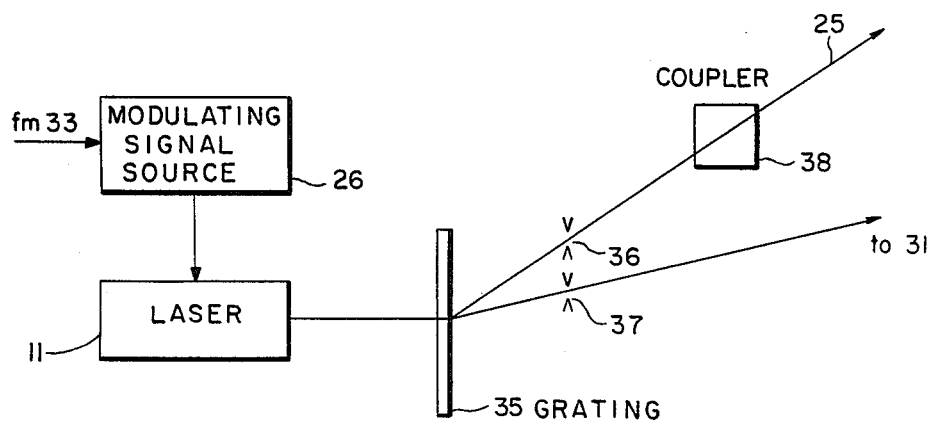
FIG. 8 is a partial block diagram of an optical transmitter according to a fourth embodiment of this invention.

Finally referring to FIG. 8, similar parts are designated by like reference numerals in an optical transmitter according to a fourth embodiment of this invention. A diffraction grating 35 is used in place of the Mach-Zehnder interferometer 15 described heretobefore. First and second slits 36 and 37 are coupled to the diffraction grating 35. In this manner, the diffraction grating 35 serves as an optical frequency discriminator.

The first slit 36 is for directing a first intensity modulated optical signal to an optical coupler 38 and thence to the optical fiber 25 of the optical communication network as the output optical beam. The second slit 37 is for supplying a second intensity modulated optical signal to the optical detector 31. In the example being illustrated, the control signal is delivered from the differential amplifier 33 to the modulating signal source 26 and is used in controlling the semiconductor laser 11 by adjusting the injection current.

It is to be noted in connection with the optical transmitter illustrated with reference to FIG. 8 that the second intensity modulated optical signal has a power which varies complementarily in relation to the first intensity modulated optical signal. It is nevertheless possible to use the negative feedback circuit in keeping the extinction ratio substantially at the optimum value. Incidentally, it is preferred that the second slit 37 has a width which is narrower than the first slit 36.

Reviewing FIGS. 5 through 8, the negative feedback circuit is used to control only one of the semiconductor laser 11 and the optical frequency discriminator which may either be the Mach-Zehnder interferometer 15 or the diffraction grating 35. It will readily be appreciated that the negative feedback circuit can be used in controlling whichever of the semiconductor laser 11 and the optical frequency descriminator 15 or 35 so as to compensate for the fluctuations which might result from the semiconductor laser 11 and/or the optical frequency discriminator 15 or 35 subjected to external disturbances.

While this invention has thus far been described in specific conjunction with a few preferred embodiments thereof, it will now be readily possible for one skilled in the art to put this invention into effect in various other manners. For example, either a Fabry-Perot interferometer or a Michelson interferometer can be substituted for the Mach-Zehnder interferometer 15. Such an interferometer can be implemented either by integrated-optics or by fiber-optics. The diffraction grating 35 may be a reflecting grating or a concave grating.

What is claimed is:

1. An optical transmitter comprising:
    a semiconductor laser responsive to a modulated injection current for generating an optical signal which includes a frequency modulated component;
    an optical frequency discriminator responsive to said optical signal for converting said frequency modulated component to an intensity modulated component to produce an output optical beam which consists essentially of said intensity modulated component;
    said modulated injection current being representative of mark and space codes, wherein said optical frequency discriminator produces said output optical beam with a high intensity for a predetermined one of said mark and said space codes and with a low intensity for the other of said mark and said space codes;
    monitoring means for monitoring said output optical beam to produce an electric signal representative of a ratio of said low intensity to said high intensity; and
    a negative feedback circuit responsive to said electric signal for controlling at least one of said semiconductor laser and said optical frequency discriminator to keep said ratio substantially at an optimum value;
    wherein said frequency modulated component has a first frequency for said predetermined one of the mark and the space codes and a second frequency for said other of the mark and the space codes, wherein said optical frequency discriminator has a first transmissivity of about 90% for the frequency modulated component of said first frequency and a second transmissivity of substantially zero for the frequency modulated component of said second frequency, said optimum value being for keeping said first and said second transmissivities substantially at about 90% and at zero, and
    said optical frequency discriminator producing an additional optical beam with a higher intensity for said predetermined one of the mark and the space codes than for said other of the mark and the space codes, wherein said monitoring means receives said additional optical beam for thereby monitoring said output optical beam to produce said electrical signal.

2. An optical transmitter as claimed in claim 1, wherein said optical frequency discriminator comprises an optical interferometer.

3. An optical transmitter comprising:
    a semiconductor laser responsive to a modulated injection current for generating an optical signal which includes a frequency modulated component;
    an optical frequency discriminator responsive to said optical signal for converting said frequency modulated component to an intensity modulated component to produce an output optical beam which consists essentially of said intensity modulated component;
    said modulated injection current being representative of mark and space codes, wherein said optical frequency discriminator produces said output optical beam with a high intensity for a predetermined one of said mark and said space codes and with a low intensity for the other of said mark and said space codes;
    monitoring means for monitoring said output optical beam to produce an electric signal representative of a ratio of said low intensity to said high intensity; and
    a negative feedback circuit response to said electric signal for controlling at least one of said semiconductor laser and said optical frequency discriminator to keep said ratio substantially at an optimum value;
    wherein said frequency modulated component having a first frequency for said predetermined one of the mark and the space codes and a second frequency for said other of the mark and the space codes, wherein said optical frequency discriminator has a first transmissivity of about 90°/o for the frequency modulated component of said first frequency and a second transmissivity of substantially zero for the frequency modulated component of said second frequency, said optimum value being for keeping said first and said second transmissivities substantially at about 90% and at zero, and said optical frequency discriminator produces an additional optical beam with a higher intensity for said other of the mark and the space codes than for said predetermined one of the mark and the space codes, wherein said monitoring means receives said additional optical beam for thereby monitoring said output optical beam to produce said electrical signal.

4. An optical transmitter as claimed in claim 3, wherein said optical frequency discriminator comprises a diffraction grating.

* * * * *